Oct. 29, 1935. U. NISTRI 2,019,234

OPTICAL DEVICE FOR THE CONTROL OF FLIGHT

Filed July 19, 1934 2 Sheets-Sheet 1

Inventor:
Umberto Nistri

Oct. 29, 1935.   U. NISTRI   2,019,234
OPTICAL DEVICE FOR THE CONTROL OF FLIGHT
Filed July 19, 1934   2 Sheets—Sheet 2
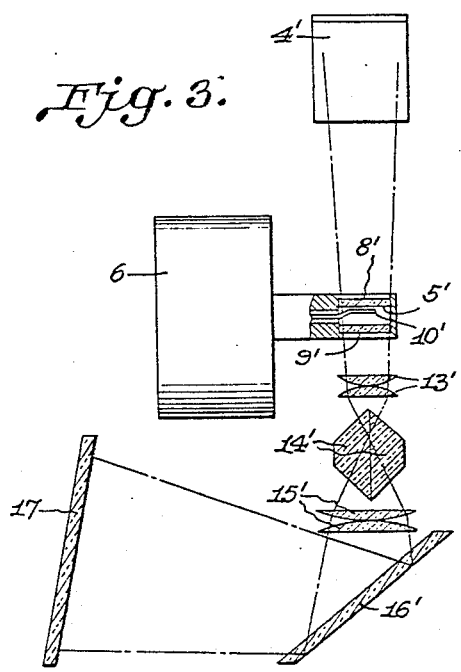
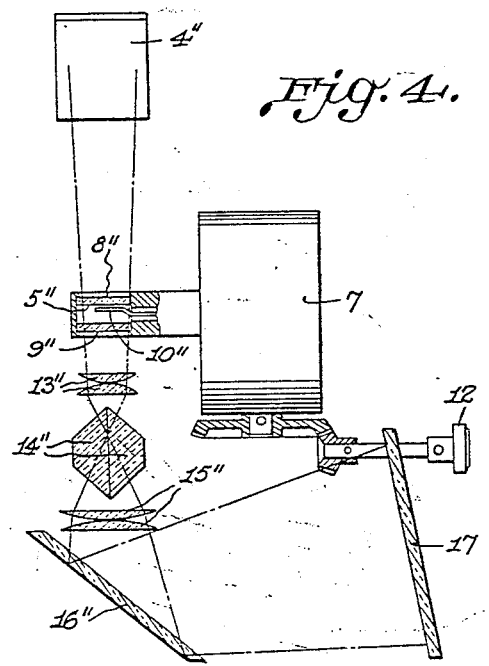
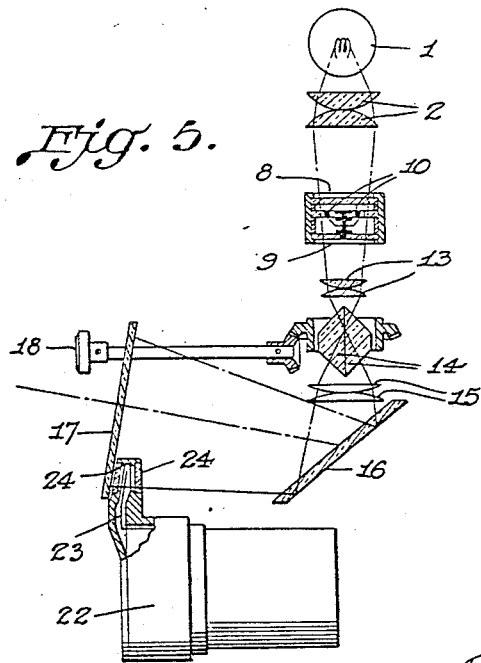

Patented Oct. 29, 1935

2,019,234

UNITED STATES PATENT OFFICE 2,019,234

OPTICAL DEVICE FOR THE CONTROL OF FLIGHT

Umberto Nistri, Rome, Italy

Application July 19, 1934, Serial No. 736,058
In Italy July 20, 1933

3 Claims. (Cl. 88—24)

As it is desirable to unite in a small space in front of the pilot, all the indispensable indications which are required to maintain the aircraft in regular flight attitude, even in the absence of any outside point of reference, many devices have been proposed and actually constructed, which are known as "flight controlling devices" in which the various indications are preferably so disposed as to form, when the pre-determined trim is attained, a simple geometrical figure which the pilot must endeavor to maintain unaltered during the flight by acting on the various levers and controls, at his disposal.

The present invention refers to improvements in such flight control devices and a form of construction is illustrated in the annexed drawings in which:

Figs. 3, 4 and 5 are longitudinal sections of the apparatus, taken respectively through lines AB, EF, CD in Fig. 1, corresponding with planes passing through the vertical axes of the variometer, of the speed indicator, and of the compass.

Figure 1:
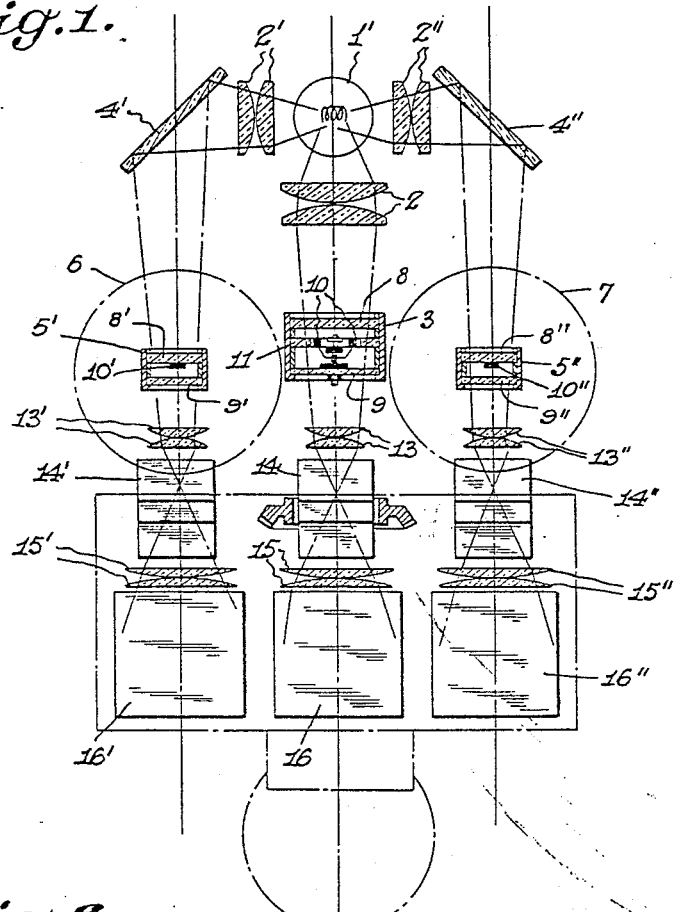
Fig. 1 is a cross section of the device.

The small electric lamp (1'), of about 30 watts, is the only source of light which may easily be replaced. A condenser (2) placed at the lower side, conveys the light through the compass bowl, while two other condensers (2'), (2'') placed one at the right and the other at the left of the lamp, cause the light to be reflected by the mirrors (4') (4'') to the graduated sectors (5') (5''), respectively of the variometer (6) and of the speed indicator (7).

The compass bowl (3) has a nearly cylindrical shape and is closed at the top and at the bottom by the glass plates (8) and (9) respectively. Inside the said compass bowl is suspended by universal joint, the movable system (10) of two magnetized parallel needles, a fixed graduated compass rose (11) engraved on a circular glass dial being provided, having its centre in correspondence with the said centre of suspension. The cavity of the compass bowl is filled with a liquid for damping the oscillations. The said compass rose, being fixed to the bowl, the latter may be made to assume a bearing within its seat so that it may be registered relatively to the longitudinal axis of the aircraft.

The variometer (6) and the speed indicator (7) are constructed in any known manner, except that they do not comprise any cinematic device for amplification of their movements, so that the movements of the manometric capsule are transmitted directly to the indexes (10'), (10''), which displace themselves horizontally, nearly in contact with their respective graduated dials (5') (5'') engraved on the lower faces of the glass covers (8'). Two other small glasses (9') serve to complete the hermetic sealing of the two instruments, which are in addition connected in the usual way, viz.; one of them to a static air scoop, and the other to the two scoops of a pilot tube.

The speed indicator (7) is rotatable about a vertical axis passing approximately through the centre of rotation of the index, so that it may be possible to bring in correspondence of the middle horizontal line of reference, the image of the portion of the scale corresponding to the speed of the attitude or position of flight; the movement obtained through gearings, being controlled by a knob or button (12) (Fig. 4).

Under the bowl of the compass and under each of the two sectors of the side instruments, are provided the objective glasses (13) (13') (13'') respectively the frontal focal planes of which coincide with the plane of the needle system of the compass and with the planes of the said sectors. Consequently the beams of light issuing from points situated in this plane, are converted into parallel beams, which after meeting a second objective glass (15), (15'), (15'') respectively having its second focal plane coinciding with the common screen (17) of projection, converge on this screen to form thereon the real images of the needle system and of the rose, as well as those of the graduated sectors and their respective index fingers.

In the space available between the objective glasses (13) (13') (13'') and (15) (15') (15'') a double Wollaston inverting prism (14) (14') (14'') respectively is placed, and between the objective glasses (15), (15'), (15'') and the screen (17), an inclined plane glass (16), (16'), (16'') respectively, is placed which allows to dispose the screen in the most convenient position for observation.

Prisms (14'), (14'') are provided only, to compensate the side inversion produced by the mirrors (15'), (16'') and consequently they are fixed. The central prism (14) however, which has a characteristic function for the observation of the compass, is rotatable about its own longitudinal axis by means of gearings controlled by an outside control button (18). In the central part of the translucent screen (16) (Figs. 3, 4, 5) are drawn (Fig. 2) parallel lines (19) which serve as reference for the image (20) of the magnetic needles; near its upper border an index (21) is traced, serving as reference for the reading on the image of the graduated rose.

It must be noted that as the compass rose is fixed, it will always be possible to obtain an optically centered image, which is consequently rotatable about the image of its centre when the prism is rotated; the relative rectifying condition being that the reflecting plane of prism (14) should be parallel to its own mechanical axis of rotation. When this condition is fulfilled, the reading on the rose's quadrant will be independent by construction from any error due to the eccentricity of the graduation. As however, the simultaneous position of reference of the image of the magnetic needles is determined by parallelism, and not by coincidence, the reading of the azimuth is not influenced even by the eventual eccentricity of the suspension point of the movable needle. system relatively to the graduated rose; the said fact being very important mainly in view of the small size of said movable equipment and also because of possible small movements of the centre of the suspension.

Within the casing (not shown) enclosing the various devices described above, is also enclosed a gyroscopic turning indicator, the index (23) of which moves within a transparent extension (24) of its casing, which penetrates into the principal casing above stated, below the image of the movable equipment and in proximity to the screen, so that the index (23) being exposed to the light of lamp (1') projects its shadow on the screen on which a central index of reference is marked, as well as others on its sides. The said index is therefore visible under the same conditions as those of the other indications appearing on the translucent screen.

Figure 2:
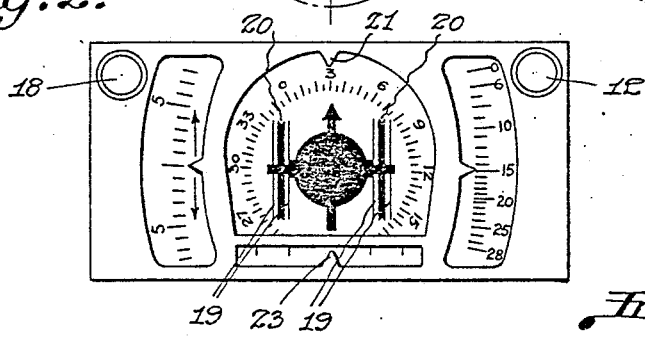
Fig. 2 is a front view of the only observation dial.

After the registration on this screen of the compass course by means of the control button (18) and the normal speed by means of the control button (12), the geometric figure of normal flight formed by the various indexes, assumes the shape shown in Fig. 2; the displacements from said normal shape will be immediately noticed by the pilot who, by suitably operating the appropriate levers and control, will re-establish the normal configuration.

The observation of all the indexes is not subject to errors of parallax, and can be effected within a widely extended field, provided that due care be taken in the mounting of the instrument on the aircraft. The visibility is excellent, at any hour both of the day and at night.

An important practical characteristic of the optical flight control above described is that the various devices with which it is accomplished, are self contained and independent from one another, and consequently, in case it should be necessary, it is easy to replace any one of them without disturbing the others.

I claim:

1. In a device of the kind described, the combination with an instrument or panel board, of means for optically projecting thereon the indications of the various flight control instruments, viz. variometer, speed indicator, bank indicator, course indicator (compass) to form a particular composite pattern having its center in correspondence with the center of the image of the compass indications, said means comprising a source of light; condensers disposed respectively laterally and in front of said source of light, said last mentioned condenser acting to illuminate the compass, reflecting mirrors cooperating with said laterally disposed condensers for directing the light rays through the quadrant of the variometer and through the quadrant of the speed indicator, the said compass comprising a transparent bowl having suspended therein by universal attachment the magnetic needle, and a graduated glass quadrant fixed to said bowl, the latter having its center in correspondence with the center of suspension of the compass, the casings of said variometer and speed indicator enclosing manometric capsules having their elastic deformations directly transformed into the movements of the respective indices in front of the graduated sectors, and a plurality of systems of lenses, mirrors and prisms all cooperating to form a visible image of the needle of the compass, of the dial and of the graduated sectors and indices of said other flight control instruments.

2. The combination as specified in claim 1, in which between the compass and the panel board adapted to receive the image there is interposed a rotatable inversion prism permitting the image of the needle to be maintained in a fixed position for any course to be followed.

3. The combination as specified in claim 1, in which the indications of the variometer and speed indicator are projected on the panel board after the optical enlargement of the manometric capsules provided for said instruments, without any mechanical means of amplification.

UMBERTO NISTRI.